United States Patent [19]

Krause

[11] 4,443,020
[45] Apr. 17, 1984

[54] MECHANICAL GRIPPING DEVICE FOR ROTATING JAW CHUCKS OR COLLET CHUCKS

[75] Inventor: Dieter Krause, Munich, Fed. Rep. of Germany

[73] Assignee: Siemens Aktiengesellschaft, Berlin & Munich, Fed. Rep. of Germany

[21] Appl. No.: 304,798

[22] Filed: Sep. 23, 1981

[30] Foreign Application Priority Data

Oct. 9, 1980 [DE] Fed. Rep. of Germany ....... 3038208

[51] Int. Cl.³ .................. B23B 31/24; B23B 31/26
[52] U.S. Cl. ............................... 279/1 DA; 74/104; 74/470; 409/233
[58] Field of Search ............... 409/233; 254/107, 110; 74/104, 470; 279/1 DA

[56] References Cited

U.S. PATENT DOCUMENTS

| | | | |
|---|---|---|---|
| 3,516,149 | 6/1970 | Mickas | 409/233 X |
| 3,680,437 | 8/1972 | Cravens, Jr. | 409/233 |
| 4,075,927 | 2/1978 | Frazier | 409/233 |
| 4,278,156 | 7/1981 | Yano et al. | 74/470 X |

FOREIGN PATENT DOCUMENTS

| | | | |
|---|---|---|---|
| 528152 | 10/1976 | U.S.S.R. | 409/233 |
| 784994 | 12/1980 | U.S.S.R. | 409/233 |

Primary Examiner—Francis S. Husar
Assistant Examiner—Steven B. Katz
Attorney, Agent, or Firm—Hill, Van Santen, Steadman & Simpson

[57] ABSTRACT

A mechanical gripping device for rotating jaw chucks or collet chucks. With the known gripping devices, rotationally symmetrical parts can be gripped in a rotating jaw chuck or collet chuck either only from the outside or only from the inside. The invention is based upon the problem of creating a mechanical gripping device for inside and outside gripping. With the invention, in a bore hole of a spindle two axially displaceable disk-shaped spring plates are arranged which are pressed into respective end positions by springs arranged between them. Centrally to the disk-shaped spring plates a slide is arranged which is selectively coupleable with one of the two spring plates.

5 Claims, 1 Drawing Figure

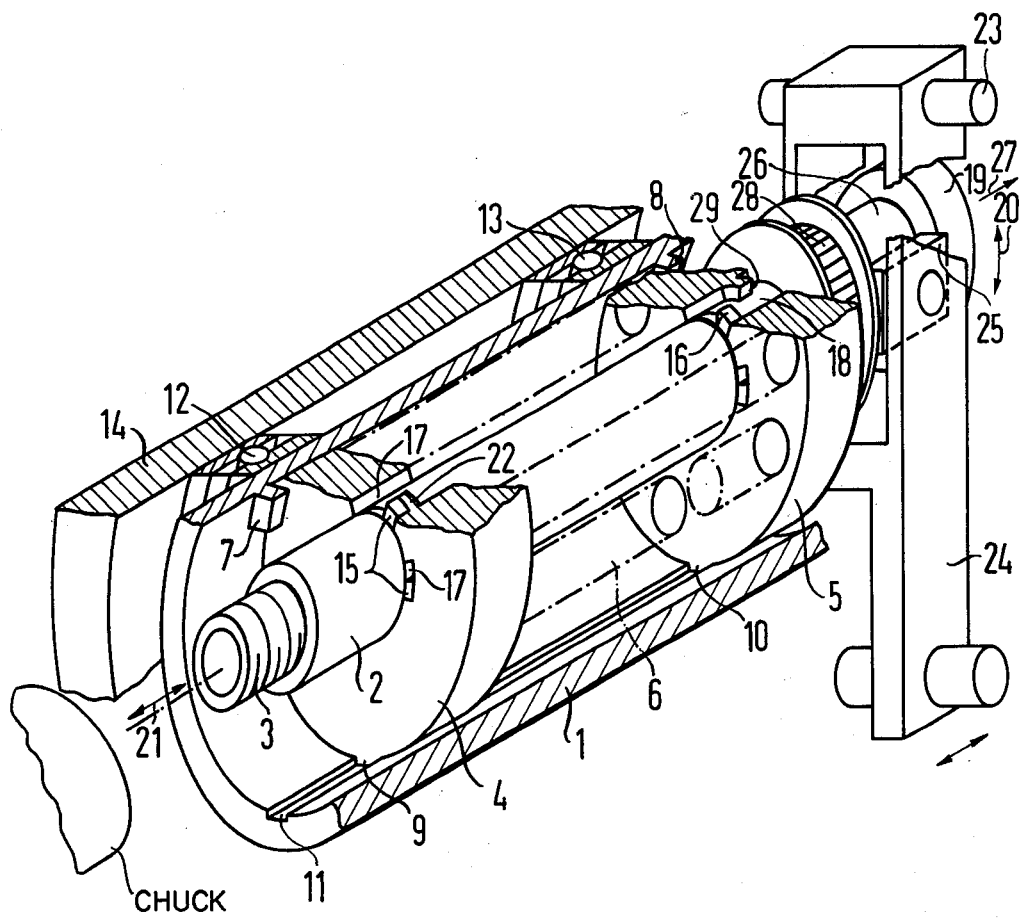

MECHANICAL GRIPPING DEVICE FOR ROTATING JAW CHUCKS OR COLLET CHUCKS

BACKGROUND OF THE INVENTION

The invention concerns a mechanical gripping device for rotating jaw chucks or collet chucks whereby the rotationally symmetrical parts can be gripped from the outside or from the inside with the help of prestressed springs arranged in a bore hole of a spindle. The springs can be prestressed by means of axial displacement of a pull rod or pressing rod which is connected with the jaw chuck or respectively the collet chuck. With some known mechanical gripping devices of this kind, rotationally symmetrical parts in a rotating jaw chuck or a rotating collet chuck can either be gripped only from the outside or only from the inside. Furthermore, gripping devices are known for machine tools which activate pneumatically, hydraulically or electromagnetically rotating jaw chucks and collet chucks.

In addition, mechanical gripping devices are known (See "Machinery", Vol. 87, pages 1308-1039, Dec. 2, 1955; German Pat. No. 597,678; and Great Britain Pat. No. 416,153, all incorporated herein by reference) wherein a gripping of rotationally symmetrical parts is possible both from the outside and from the inside.

In the case of such known devices, in a bore hole of the spindle, a jacket or socket 37 (as shown in the above indicated British Patent drawings) is arranged shiftably in which springs 39, 41 act upon a helical spring plate 38. This helical spring plate is tightly connected with the centrally arranged slide 31 whose free end is connected with a jaw chuck or, respectively, with a collet chuck.

SUMMARY OF THE INVENTION

It is an object of the invention to create a mechanical gripping device of the type described above with which rotationally symmetrical parts can be gripped in a rotating jaw chuck or in a rotating collet chuck both from the outside and from the inside and wherein two spring plates which are selectively coupleable with the slide are provided.

This problem is solved in a case of a mechanical gripping device of the kind described above by providing in the bore hole of the spindle two axially displaceable disk-shaped spring plates which are pressed into their final positions by means of pressure springs arranged between them. Centrally to the disk-shaped spring plates, a slide is arranged which activates the jaw chuck or, respectively, the collet chuck. The slide in the non-rotating state of the spindle is coupled selectively with one of the two spring plates in such manner that in the case of each gripping process, the spring plate coupled with the slide in each case is movable against the direction of force of the pressure springs.

In this manner, the direction of force of the pressure springs acting upon the slide can be changed by 180°. Accordingly, in a simple manner, a jaw chuck or a collet chuck can be quickly changed over from inside to outside gripping and conversely.

Preferably, for coupling of the slide with one of the two spring plates, there is developed on the slide at least one cam associated with each spring plate which is engageable in a bayonet-catch-like recess in the bore hole of the associated spring plate.

A significant improvement with respect to the known gripping devices described above is that in such older devices, for the prestressing of the springs, the jacket or socket must be displaced axially such as by use of motors. For this purpose, the socket typically is connected with a flange-mounted motor. Also, the jacket may be driven directly by a motor and the jacket is provided with an exterior thread. These motors must be reversible in the direction of rotation whereby the springs are correspondingly prestressed for the attainment of outside or inside tension. In contrast to this, in the invention the coupling of the corresponding helical spring plate may be easily undertaken by hand in the simple coupling manner described herein.

BRIEF DESCRIPTION OF THE DRAWING

The FIGURE shows a section through a spindle of a machine tool, and wherein only the parts necessary for understanding of the invention are depicted.

DESCRIPTION OF THE PREFERRED EMBODIMENTS

In the drawing, a spindle 1 is shown which in a front part has a spindle head not depicted in the drawing, and which in a known manner is provided with a collet chuck or a jaw chuck. In both cases, a conical part cooperates with a conical bore hole such that in the case of relative displacement of the two parts, a rotationally symmetrical part is gripped from the outside or from the inside. The axial relative movement between cone and cone bore hole proceeds in a manner know per se via a pulling or pressing rod which in the case of the inventive gripping device is designed as a tube-shaped slide 2 which at its end 3 has threads for a jaw chuck or a collet chuck. The axis of the tube-shaped slide 2 is exactly aligned with the axis of the spindle 1. It is held by means of two disk-shaped spring plates 4 and 5 which are arranged axially displaceably in the bore hole of the spindle 1. Between the spring plates, press springs 6 are arranged which press the spring plates 4 and 5 against stops 7 and 8 connected rigidly with the spindle 1. For the sake of overview, only two stops 7 and 8 are shown in the drawing. It is practical when several stops are provided which are distributed uniformly over the circumference. Also, an individual ring can be provided which limits the axial mobility of the spring plates 4 and 5. In order to prevent a relative twisting of the spring plates 4 and 5 with respect to the spindle 1, cleats or projections 9 and 10 are provided on the circumference of the spring plates 4 and 5 which can slide in a corresponding groove 11 in the interior of the spindle 1. The spindle 1 is again rotatably mounted with the help of ball bearing 12 and 13 in a housing 14 which, for example, is hollow and cylindrical.

Each spring plate 4 or, respectively 5, has associated with it at least one cam 15 or, respectively, 16, arranged on the slide 2. These cams are lockable in bayonet-catch-like recesses 17 and 18 of the spring plates 4 and 5. Here the cams 15 and 16 provided on the slide 2 are arranged in reference to the bayonet-catch-like recesses 17 and 18 such manner that for the purpose of coupling of the slide 2 with one of the two spring plates 4 or 5, with the slide 2 meander-shaped axial and rotational movements must be carried out. For this purpose, the slide 2 is provided on the back end with a handle 19. With this, the slide 2 can be pivoted both in the direction of the arrow 20 and also in axial direction (arrow 21) as will be explained more precisely below.

In the depicted position of the slide 2, the cam 15 shown in the axial direction lies behind a tooth or projection 22 which projects into the recess 17. In this position, a pressure lever 24 which is pivotable about an axis of rotation 23 is in its left end position in relation to the drawing. The pressure lever 24 is in form-locking connection with the slide 2 via slide rings or rocker arms 25 arranged on both sides of the slide, which slide in a corresponding annular T slot or snap ring groove of the slide 2. If now the pressure lever 24 for the gripping is pivoted in a counterclockwise direction, then the slide 2 is moved in the direction of the arrow 27, whereby via the cam 15 as well as the tooth 22, the spring plate 4 is also moved in the direction of the arrow 27 with further compression of the pressure springs 6, specifically far enough that the rotationally symmetrical part can be introduced into the jaw chuck or into the corresponding collet chuck. Now, as soon as the pressure lever 24 is released, the pressure springs 6 relax to the extent that the part being gripped allows. The rotationally symmetrical parts are now gripped with a guite specific pretension in the jaw chuck or in the collet chuck. The gripping force depends upon the number and the strength of the pressure springs 6. Since no force is acting any longer on the pressure lever 24, the frictional connection between pressure lever 24 and the slide 2 is released so that the spindle 1 can rotate free of friction. For the driving of the spindle, this is provided with a drive or bevel gear 28.

If the direction of force of the pressure springs 6 acting upon the slide 2 are changed by 180°, then the slide 2 is uncoupled from the spring plate 4 and following this is coupled with the spring plate 5. This takes place after relieving the force of the pressure lever 24 by turning handle 19 in a clockwise direction to such an extent that the cam 15 passes the tooth or projection 22 when the cam 15 contacts the opposite surface of the recess 17. The same movement is carried out also by the cam 16 associated with the spring plate 5. By means of axial pulling in a direction of the arrow 27 or the slide 2, the cam 16 here strikes against a tooth or projection 29 projecting into the recess 18. In order to now proceed to the coupling behind this tooth or abutment 29, with the help of the handle 19 the cam 16 must again be pivoted in a counterclockwise direction until it arrives at the stop at the opposite surface of the recess 18. In this position, the cam 16 passes the tooth 29 and can now be brought by means of turning of the handle 19 behind the tooth 29. With this, the coupling of the slide 2 with the back spring plate 5 is produced. The slide accordingly carries out an axial movement in the direction of arrow 27 which also has the effect that now the pressure lever 24 is pivoted into its other end position in a counterclockwise direction. If now the pressure lever 24 is pivoted in the clockwise direction for the gripping, then by means of the cam 16 lying behind the tooth 29, the spring plate 5 is moved counter to the arrow direction 27 with compression of the pressure springs 6. After introduction of the rotationally symmetrical part into the jaw chuck or into the collet chuck, the pressure lever 24 is again released, whereby further gripping of the part to be processed takes place by means of partial relaxing of the pressure springs 6. The pressure lever 24 can be activated by hand as well as pneumatically or in another manner.

Although various minor modifications may be suggested by those versed in the art, it should be understood that I wish to embody within the scope of the patent warranted hereon, all such embodiments as reasonably and properly come within the scope of my contribution of the art.

I claim as my invention:

1. A mechanical chuck activating system for rotating chucks, comprising: a chuck; means for activating the chuck for gripping of a part to be rotated from the outside or from the inside by either pulling or pressing a member to which the chuck is coupled, said means including pressure springs and two spring plates arranged in a bore hole of a spindle, the springs being arranged such that they are prestressable by means of axial displacement of a pulling or pressing slide means coupled to the chuck to operate it; axially spaced stop means in said spindle bore defining spaced end stop positions, each of said spring plates being axially displaceable up to a respective one of said end stop positions, each of the plates being pressed to the respective one of said end stop positions by said pressure springs arranged between the plates; said pulling or pressing slide means being positioned through the spring plates for activating the chuck; and coupling means selectively coupling said slide means with one of the two spring plates while the other spring plate is uncoupled and vice-versa so as to selectively provide either a pulling or pressing force via the slide means to the chuck.

2. A mechanical system according to claim 1 wherein the coupling means for coupling the slide means with either one of the two spring plates comprises at least one cam on the slide means associated with each spring plate and positioned for engagement in a bayonet-catch-like recess in a bore hole of the associated spring plate through which the slide means passes.

3. A mechanical system according to claim 2 wherein the cams provided on the slide means are arranged in relation to the bayonet-catch-like recesses of the spring plates such that for coupling of the slide means with one of the two spring plates axial and rotational movements of the slide means occurring one after the other must be carried out along a meander-path.

4. A mechanical system according to claim 1 wherein the slide means is activatable by a pressure lever via sliding guides.

5. A system according to claim 1 wherein the spring plates are disk-shaped.

* * * * *